United States Patent [19]

Northup

[11] 4,411,681
[45] Oct. 25, 1983

[54] METHOD AND APPARATUS FOR MANUFACTURING GLASS BOTTLES

[75] Inventor: John D. Northup, Toledo, Ohio

[73] Assignees: Ruth B. Northup; John D. Northup, Jr.; Nancy N. Lehrkind; Mary E. Northup, all of Toledo, Ohio

[21] Appl. No.: 458,169

[22] Filed: Jan. 14, 1983

[51] Int. Cl.³ .................................. C03B 11/10
[52] U.S. Cl. .............................. 65/77; 65/68; 65/79; 65/81; 65/82; 65/229; 65/230; 65/300
[58] Field of Search ............ 65/68, 77, 79, 81, 82, 65/229, 230, 246, 300

[56] References Cited

U.S. PATENT DOCUMENTS

| | | | |
|---|---|---|---|
| 3,216,813 | 11/1965 | Mumford | 65/229 X |
| 3,271,123 | 9/1966 | Benard | 65/82 X |
| 3,622,305 | 11/1971 | Becker | 65/229 |
| 3,644,111 | 2/1972 | Becker | 65/229 X |
| 3,765,862 | 10/1973 | Rowe | 65/229 |
| 3,846,103 | 11/1974 | Rowe | 65/79 |
| 4,336,050 | 6/1982 | Northup | 65/82 |

Primary Examiner—Robert L. Lindsay, Jr.
Attorney, Agent, or Firm—Emch, Schaffer & Schaub Co.

[57] ABSTRACT

A method and apparatus for manufacturing glass bottles and more specifically an apparatus and a method for forming parisons is disclosed. At least one blank mold defines a mold cavity having an opening at its upper end for receiving a premeasured gob of molten glass from a loading cavity member. A plunger having a volume of at least 15% of the volume of the mold cavity is completely extended into the mold cavity prior to the reception of the molten glass. The molten glass is moved downwardly from said loading cavity member into the mold cavity. Fluid force presses the molten glass against the walls of the mold cavity and against the extended plunger. The opening in the mold is closed by a baffle and the plunger retracted. Compressed air is applied through the neck of the parison to expand the parison outwardly against the mold cavity and a mold surface defined by the baffle means. The parison is then separated for further processing in the bottle making operation.

9 Claims, 12 Drawing Figures

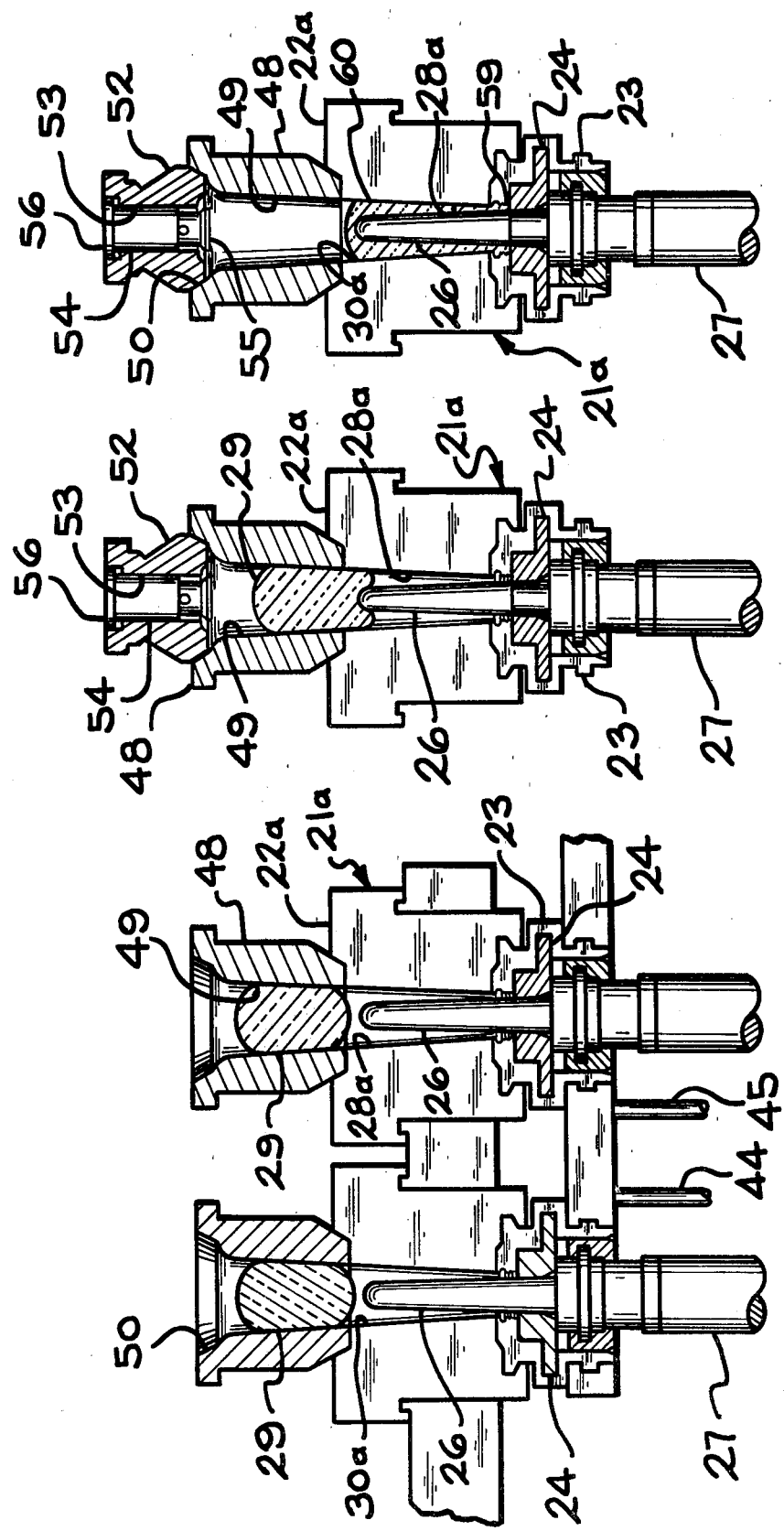

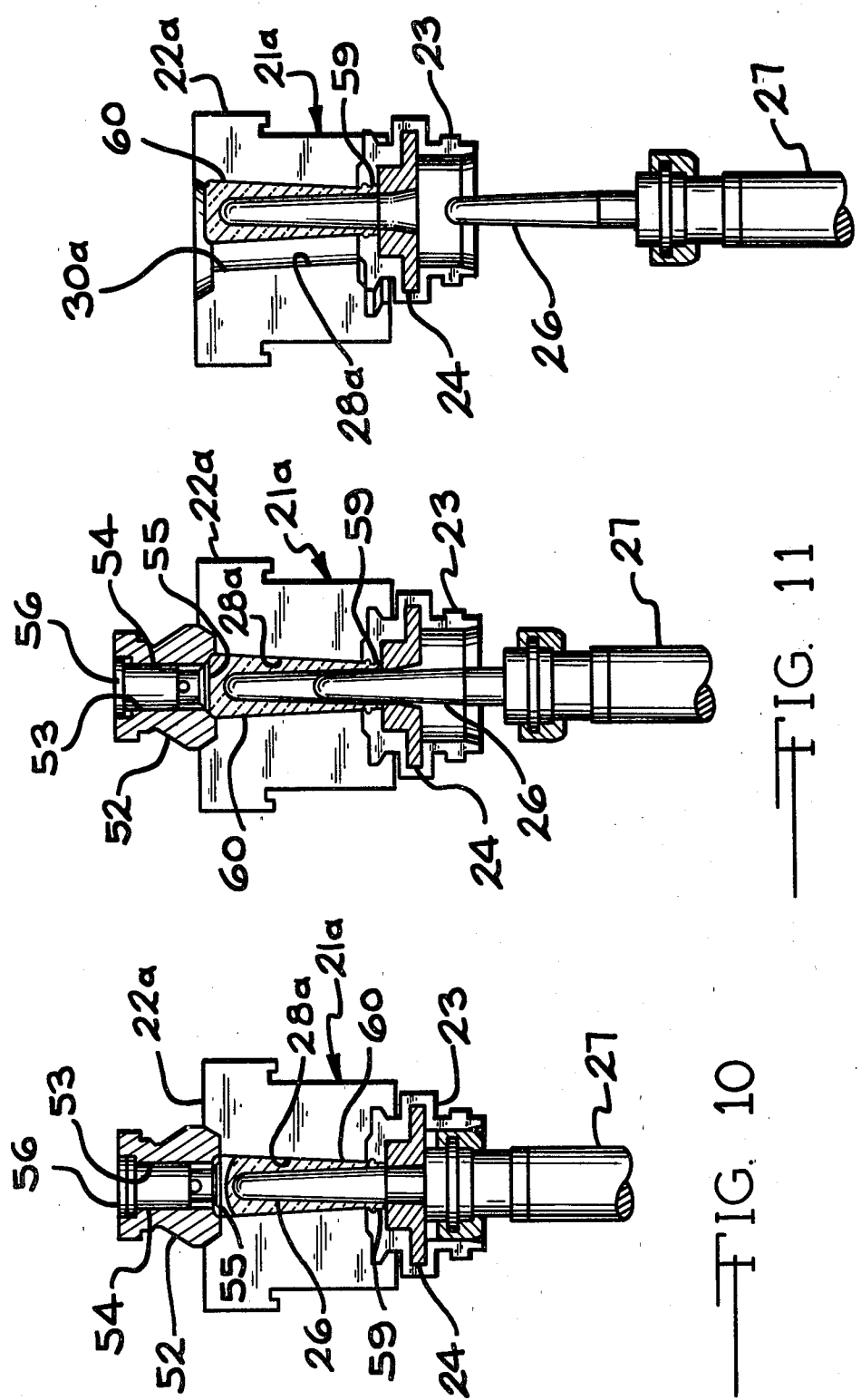

METHOD AND APPARATUS FOR MANUFACTURING GLASS BOTTLES

BACKGROUND OF THE INVENTION

In the glass industry today the most common glass container manufacturing machine is the Hartford type "I.S." machine. The basic I.S. machine is described in U.S. Pat. Nos. 1,843,160; 1,911,119; and 2,289,046.

In a conventional Hartford I.S. type of glass bottle machine, a purality of individual sections are operated in timed relationship to one another. Individual gobs of molten glass from an automatic feeding device are fed to the blank mold side of each of the stations. Each section has one or more upwardly opened blank molds for receiving the molten gob, or groups of gobs. The machine is capable of forming glass bottles from these molten gobs by either the well known blow-and-blow process or the well known press-and-blow process. Generally, the blow-and-blow process is used to make narrow neck bottles and the press-and-blow method is used to make wide mouth bottles or jars. Because the press-and-blow process produces bottles with more uniform wall thickness, it offers an opportunity to reduce the weight of narrow neck bottles, but technical factors have made it difficult and, in many instances, impractical to do this. Examples of this process are disclosed in Mumford, U.S. Pat. No. 3,216,813; Becker U.S. Pat. No. 3,622,305; Becker U.S. Pat. No. 3,644,111; Rowe U.S. Pat. No. 3,765,862 and Foster U.S. Pat. No. 4,009,016.

An early attempt to form a blank using upper air pressure and a lower plunger is disclosed in Loper et al. U.S. Pat. No. 1,197,837. In the Loper et al. method a lower plunger was extended upwardly into the blank mold cavity after the gob of molten glass was already received in the blank mold cavity. Other refinements have been made in order to better control the process and in an effort to make the blown bottles lighter in weight and more uniform in wall thickness. Prior art apparatus which is directed to parison forming is disclosed in Wendle U.S. Pat. No. 3,271,127 and Northup U.S. Pat. No. 4,336,050.

It has been known that under prior art systems the successful operation of a glass container narrow-neck press-and-blow process producing a bottle having a 26 mm crown finish or 28 mm thread finish, which are the prominent beer and beverage sizes, depends on the close maintenance of the volume of the blank mold cavity and of the pressing plunger. Furthermore, the weight of every the gob of glass had to be held to an extremely close-tolerance specification. Most bottle manufacturers do not attempt to operate the press-and-blow process on finishes below 38 mm in size because the cost of maintaining the close specifications exceeds the economic advantage of being able to reduce the weight of the glass in the bottle. For example, maintaining individual gob weight to a close tolerance became more complex as the number of gobs being ejected simultaneously from the feeder was increased. It is very difficult for a manufacturer to attempt to run a triple gob narrow-neck press-and-blow or even to consider a quadruple gob operation.

The need for the close gob specification control, under prior art apparatus and methods, results because the inside diameter of the bottle finishes in beer and beverage sized bottles is only three quarters of an inch, necessitating a pressing plunger diameter only slightly larger. The pressing plunger has to be tapered in order to be withdrawn from the glass after the blank or parison has sufficiently chilled, because the glass shrinks around the plunger as it cools.

In these prior art press-and-blow processes, whenever the volume of a hot glass gob exceeded the volume of the blank and finish cavity minus the volume of the plunger, an over-press occurs, creating a highly objectionable rough seam on the finish of the container. If the volume of the hot glass gob was less than the volume of the blank and finish cavity minus the volume of the plunger, proper pressing did not occur because the fluid mass of glass was not confined. In addition to over and under variations in gob volume, the volume of the plunger in the blank and finish cavity also varied because of differences in the penetration of the plunger.

When attempting to run a triple gob operation or other multiple gob operation, the normal variations in gob volume and plunger penetration when using prior art apparatus and the press-and-flow method often resulted in unsatisfactory results when attempting to produce narrow-neck bottles.

The primary object of the present invention is to produce glass bottle parisons in a narrow-neck press-and-blow operation by providing an apparatus and method that is more tolerant of glass gob weight variations.

Generally in my invention, this objective is accomplished by initially extending a cavity plunger, having a volume of at least 15% of the volume of the blank mold cavity, into the blank mold cavity prior to introducing the gob of molten glass. The plunger is used to produce a cavity in the glass parison and to cool the surface of the interior wall of the glass parison. After introduction of the molten glass into the loading cavity which is located immediately above the blank mold cavity, the gob is forced into the blank mold cavity by air pressure, either positive or negative. This force is applied after the molten glass gob has made contact with the wall of the loading cavity and created a seal. In the preferred embodiment, compressed air is applied to the gob from a blow head and baffle assembly which moves into position at the top of the mold. This fluid force moves the glass from the loading cavity into the blank mold cavity. The air presses the molten glass into contact with the mold cavity walls and into contact with the plunger with a force similar in degree to the pressing force of prior art processes. After pressing and cooling, the air is shut off and the plunger is retracted slightly. Compressed air is then blown into the finish of the parison to expand the parison slightly to compensate for gob weight variation and to force the molten glass firmly against the cavity walls and against the mold surface of the baffle to provide the necessary "chill" and to complete the parison formation. After this, the air is shut off, the baffle retracts, the plunger retracts completely, and the blank mold opens. The completed parison is then removed from the parison forming-area by movement of the finish mold.

Under the present apparatus and method, variations in the gob weight do not have the same impact as was true in most prior art narrow neck press-and-blow processes. The plunger is extended prior to pressing. Therefore there is no difference in plunger volume from one operation to the next. If the volume of the hot glass exceeds the specified volume over-press does not result. Similarly, if the amount of the hot glass in any particular gob is less than the specified weight, the fluid mass of the glass is still confined and proper pressing still results. Therefore, the present apparatus and method is suitable for a high production, economic, high multiple gob narrow neck press-and-blow operation.

BRIEF DESCRIPTION OF THE DRAWINGS

FIG. 7 is a view similar to FIG. 1, showing another embodiment of a multi gob operation, according to the present apparatus and method, and showing a separate loading cavity member positioned adjacent the upper end of each blank mold with the gob positioned within such loading cavity member and the plungers extended.

FIGS. 8-12 show a single blank mold, of the FIG. 6 embodiment, at various stages of the operation;

FIG. 8 is a view of the FIG. 7 embodiment showing the baffle member seated on the loading cavity member;

FIG. 9 is another view of the FIG. 7 embodiment with fluid being applied to the molten glass to press the molten glass against the plunger and against the walls of the blank mold cavity;

FIG. 10 is another view of the FIG. 7 embodiment, in which the loading cavity member has been removed and the baffle means positioned adjacent the open end of the blank mold cavity;

FIG. 11 is another view of the FIG. 7 embodiment showing the plunger retracted and compressed air being introduced through the parison finish to expand the molten glass against the walls of the blank mold cavity and the baffle; and FIG. 12 is another view of the FIG. 7 embodiment showing the plunger completely retracted, the baffle removed and the completed parison separated from the blank mold.

DESCRIPTION OF THE PREFERRED EMBODIMENTS

Figure 1:
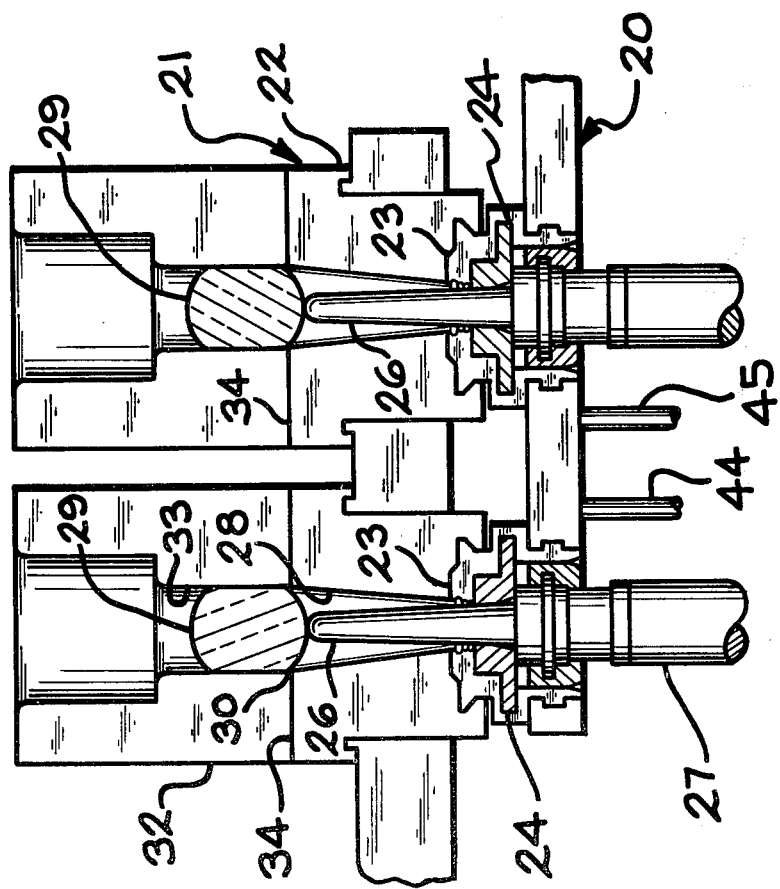
FIG. 1 is a vertical section view of a parison forming apparatus with gobs of glass being introduced into the blank molds in a multi-gob operation.

Referring to FIG. 1, a modified parison forming section, for a modified I.S. type glass container apparatus, is generally indicated by the reference number 20. A complete description of a modified I.S. type of glass container manufacturing machine is disclosed in my U.S. patent application Ser. No. 398,363, filed July 14, 1982. The parison forming section 20 includes a plurality of blank molds 21. While two inverted blank molds 21 are shown in the present embodiment, the present invention may be used with one blank mold or different pluralities of blank molds 21. For example, it is possible to use triple and quadruple blank molds 21 using the present apparatus and method. Each of the blank molds 21 includes two split blank cavity molds 22 which mate with two split neck molds 23. Each neck mold 23 mates with a one piece annular guide ring 24.

A parison cavity plunger 26 is carried by a rod 27 and is extended into an inverted blank mold cavity 28 which is defined within the split blank mold 22. The mold cavity 22, the neck mold 23, the guide ring 24, the plunger 26 and the baffle 37 constitute the glass blank cavity.

The blank mold 21 defines an opening 30 at its upper end for receiving a premeasured gob of molten glass 29. In the FIG. 1 embodiment, an integral loading cavity member 32, which defines a loading cavity 33 is positioned adjacent to the upper end of the blank mold 21. The loading cavity 33 is coaxially aligned with the opening 30 and the blank mold cavity 28. The loading cavity 33 meets the blank mold cavity 28 at the line 34.

Figure 6:
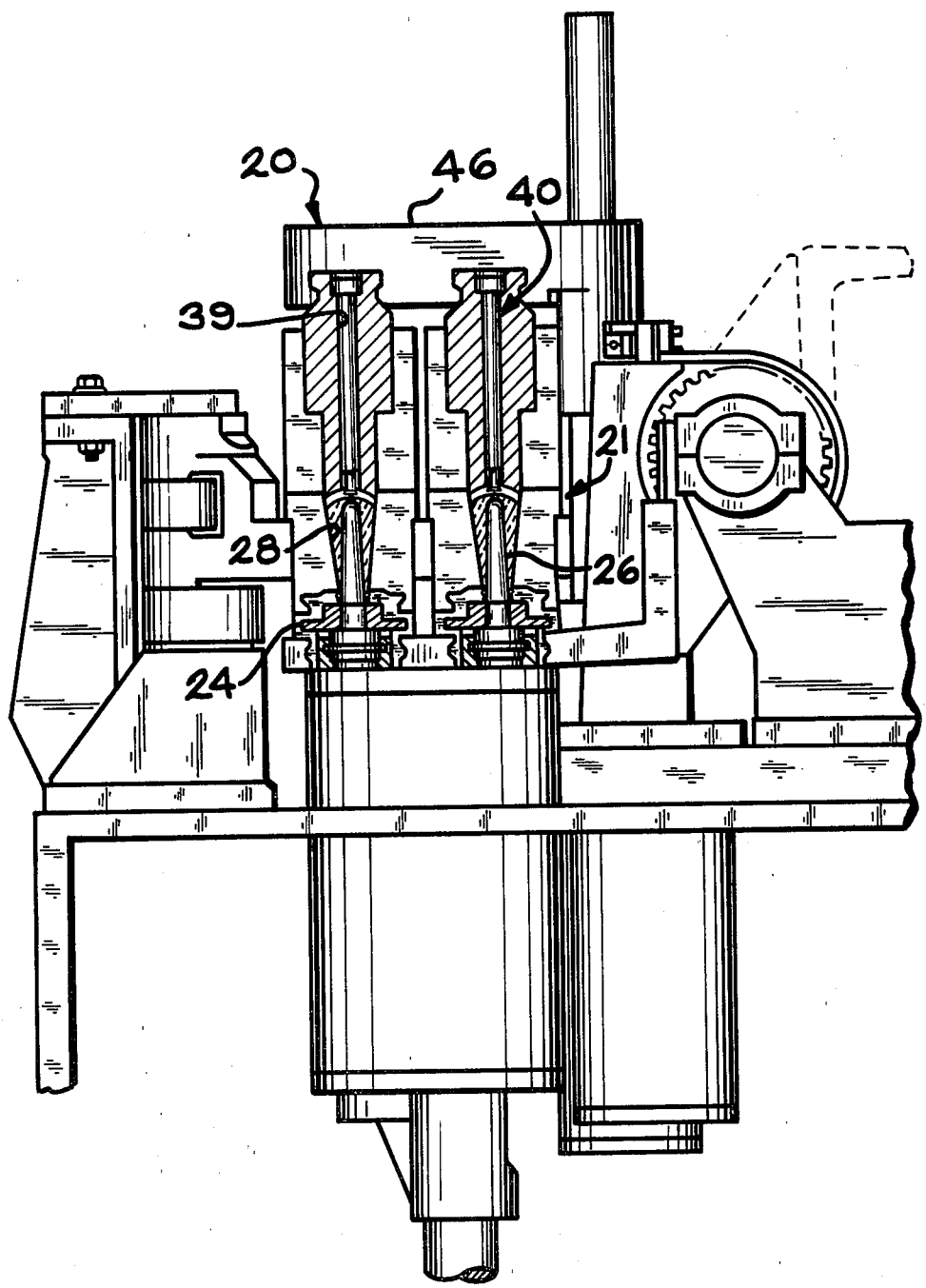
FIG. 6 is an elevation view of a portion of an "I.S." type apparatus, including parison forming apparatus according to the present invention.

A blow head 35 (See FIG. 2) includes a lower portion 36 which extends downwardly into mating relationship with the blank mold cavity 28 and includes a baffle surface 37. The blow head 35 also includes an integral upper portion 38 which is received by a top extension of the loading cavity member 32 to provide a seal. A passageway 39 extends through the baffle member 35. Valve means are associated with the passageway 39 to form a means for introducing compressed fluid for pressing and for closing or opening the passageway and the blank mold cavity 28 to atmospheric air. The blow heads 35 are mounted in blow head arm 46 (FIG. 6) which moves them into and out of position. Compressed air to the passageway 39 and to the blank mold cavity 28 is supplied through this blow head arm 46. Other means of supplying compressed air to the upper end of the blank mold cavities 28 may also be used.

In the present embodiment, a poppet valve assembly 40 having an upper end 41 and a lower end 42 is mounted within the passageway 39. Referring to FIG. 1, a fluid conduit 44 is in communication with the lower end of the blank mold 44 to apply fluid pressure, such as compressed air through the finish of the parison, as described below.

Figure 2:
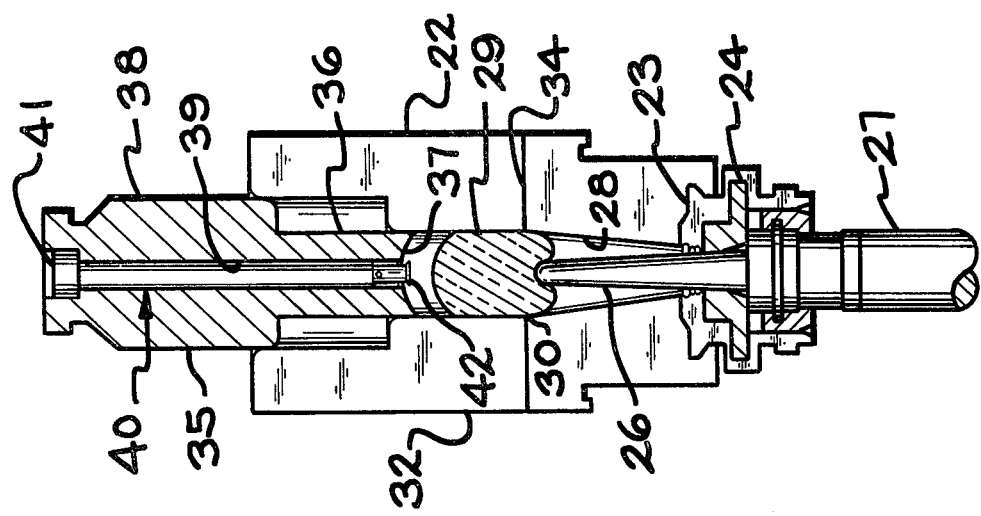
FIG. 2 shows the FIG. 1 embodiment, according to the invention with the plunger extended and the baffle means positioned above the loading cavity opening.

The plunger 26, when in its extended position as shown in FIG. 2, has a volume of at least 15% of the volume of the blank mold cavity 28. The plunger 26 is movable between an initial extended position shown in FIG. 2 where the plunger 26 is positioned within the mold cavity 28 and a retracted position shown in FIG. 5. Referring to FIGS. 2-5, each of these views also shows the apparatus of FIG. 1, in various operational stages.

Another embodiment of apparatus according to the present invention is shown in FIGS. 7-12. Again, a blank mold 21a defines a blank mold cavity 28a. The blank mold 21a also defines an opening 30a adjacent the top of the blank cavity molds 22a.

A separate annular loading cavity member 48, defining a loading cavity 49, is initially positioned on the blank cavity molds 22. The loading cavity 49 is coaxial with and in communication with both the opening 30a and the blank mold cavity 28a. The loading cavity member 48 also defines an internal shoulder 50. Referring to FIGS. 8-11 a blow head member 52 is received by the internal shoulder 50 during the first steps of the method. Subsequently, as best shown in FIGS. 10 and 11 the blow head member 52 is removed. The loading cavity member 48 is removed and the blow head member 52 is then received by the blank cavity mold 22a adjacent the opening 30a. The blow head member 52 defines a passageway 53 therethrough. Again, a valve assembly, for example a poppet valve assembly 54, is mounted within the passageway 53. The blow head member 52 includes a lower mold end 55 and an upper end 56. During operation, the blow head arm 46 or other supply apparatus introduces a fluid, such as compressed air, through the poppet valve assembly 54 and through the passageway 53. The passageway 53 also serves as a path of communication between the blank mold cavity 28a and atmosphere at certain times during the present improved narrow neck press-and-blow technique.

First referring to FIGS. 1–5, in a typical operation according to the present method, the parison cavity plunger 26 is extended to the position shown in FIGS. 1–2. The present method is primarily for use in multiple blank mold cavity operations where multiple gobs of molten glass are being inserted into the blank molds simultaneously. This method is particularly useful for triple or quadruple gob operations where high volume production are being produced. However, the present method may also be used in single blank mold cavity operations.

After the plungers 26 have been fully extended, premeasured gobs of molten glass are introduced into the loading cavities 33 of the loading cavity members 32. As best shown in FIG. 1, the gobs initially close the openings 30 of the blank mold cavities 28 to form a seal. The gobs 29 are moved downwardly from a loading position to a pressing position in the blank mold cavities 28 by supplying compressed air to the upper portions of the loading cavities 33.

Figure 4:
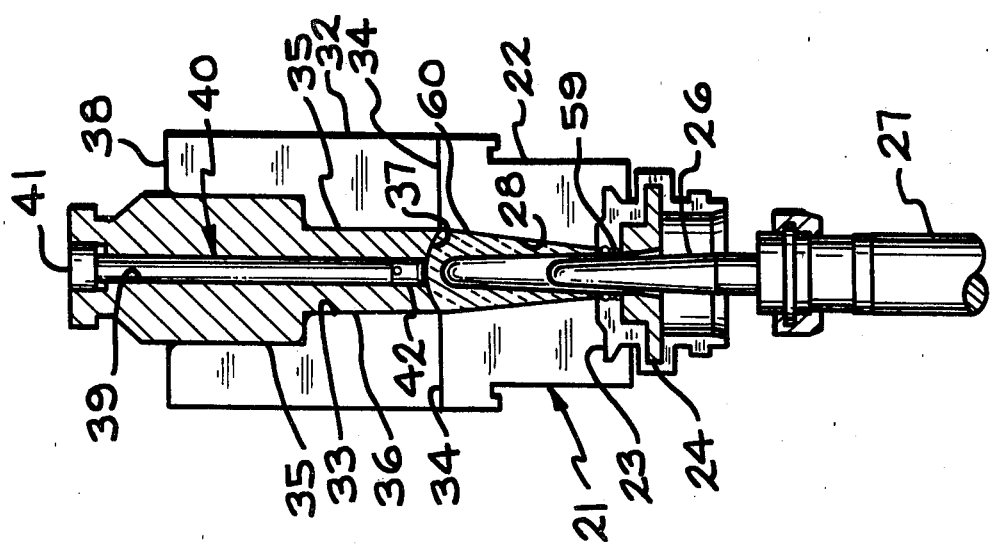
FIG. 4 shows the same embodiment with the plunger retracted and fluid being introduced through the parison finish to expand the molten glass against the walls of the blank mold cavity and against a mold surface of the baffle means.
Figure 3:
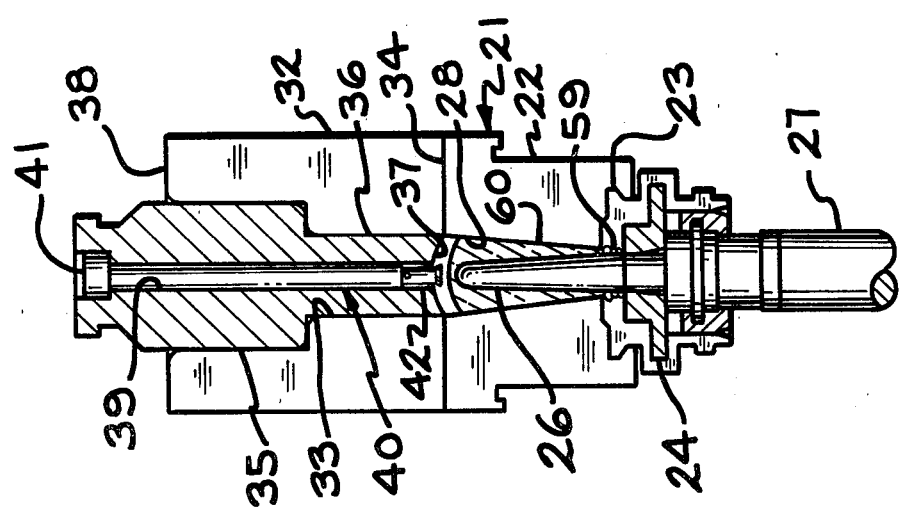
FIG. 3 shows the same embodiment during fluid pressing of the molten glass gob.

The baffle member 35 is moved downwardly to the position shown in FIG. 3 and compressed air in excess of 80 p.s.i.g. creates a fluid pressure on the molten glass gob 29 pressing the molten glass into conformity with the blank mold cavities 28 and the plungers 26. The pressing fluid is normally between 80 p.s.i.g. and 250 p.s.i.g. The FIG. 1 embodiment uses compressed air at 160 p.s.i.g. as the pressing force on a parison having a 26 mm. or 28 mm. finish. After a controlled pressing and cooling period, the compressed air is discontinued and the plungers 26 retracted slightly to disengage them from the interior wall of the parisons 60. Compressed air is then introduced through the necks or finishes 59 of the parisons 60. The compressed air entering through the neck 59 from the fluid conduit 44 expands the parisons 60 outwardly against the extreme upper walls of the blank mold cavities 28 and against the mold baffle surface 37 of the blow head member 35 as long as necessary to provide the proper amount of cooling. As shown in FIG. 4, the poppet valve assembly 40 is moved to its upper position whereby communication is provided to atmosphere.

Figure 5:
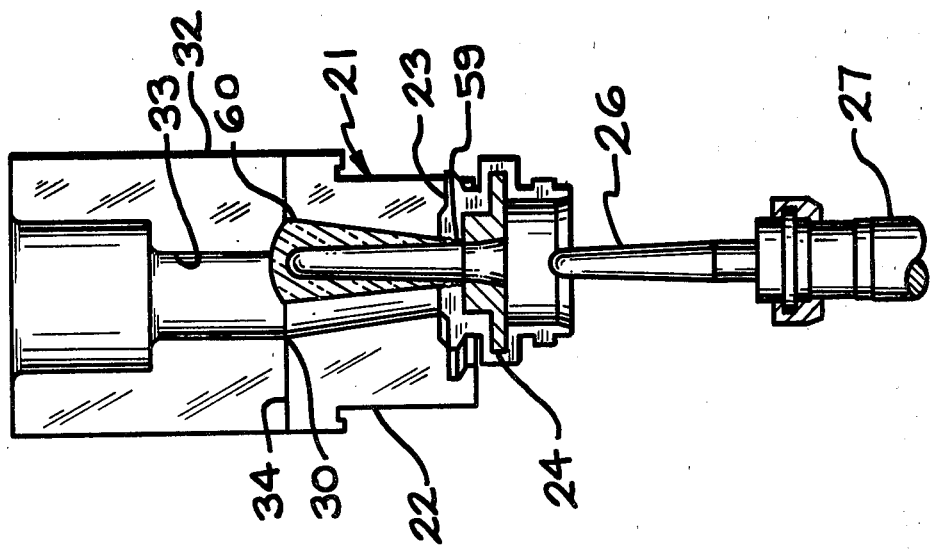
FIG. 5 shows the same embodiment with the baffle means removed, the plunger completely retracted, and the blank mold being removed from the completed parison.

This completes the formation of the parisons 60 and provides the chill to that outer surface of the glass which heretofore had not made contact with a mold surface. The plungers 26 are then further retracted and the completed parisons 60 are separated from the blank cavity molds 22, as shown in FIG. 5.

The above described method combines the gob weight variation tolerance of the blow and the blow method with the several advantages gained in pressing the parison. This is a major step forward in the more rapid production of uniform wall, narrow-neck glass containers.

Referring to FIGS. 7–12, the method when using the FIG. 7–12 apparatus is the same. In this embodiment, the annular loading cavity member 48 are separable from the blank cavity molds 22a. Referring to FIG. 7, the loading cavity members 48 are initially positioned on the blank cavity molds 22a and the parison cavity plungers 26 are moved to their extended positions within the blank mold cavities 28a. Gobs of premeasured molten glass 29 are introduced into the loading cavities 49 of the loading cavity member 48. An air seal occurs. The blow head arm 52 is moved into position and in communication with the loading cavities 49. The gobs 29 are moved into the blank mold cavities 28a. Compressed air is introduced to the upper surfaces of the gobs 29. The fluid force of the compressed air acting on the upper surfaces of the gobs 29 press the gobs against the walls of the blank mold cavities 28 and against the plungers 26, as shown in FIG. 9. The blow head arm 52 is removed, the separable loading cavity members 48 removed, and the member 52 moved into position at the upper end of the blank mold cavity 28a, as best shown in FIG. 10. The plungers 26 are retracted and compressed air is introduced through the necks 59 of the parisons 60. This forces the parisons 60 outwardly expanding them to the FIG. 11 position against the walls of the blank mold cavities 28a and the lower mold ends 55 of the members. After a cooling period, the plungers 26 are further retracted and the completed parisons 60 separated from the blank cavity molds 22a, as best shown in FIG. 12.

It should be apparent that, while preferred embodiments of the present invention have been described in detail, other embodiments and modifications will be apparent to persons skilled in the art without departing from the scope of the invention as defined in the following claims.

What I claim is:

1. The method of forming glass parisons from which glass containers are formed in a machine having at least one blank mold and baffle means, the mold and the baffle means defining a cavity and having a cavity plunger in line with the cavity, the method comprising the steps of:

moving the plunger into the cavity to its completely extended position, introducing a measured gob of molten glass to a loading position above the blank cavity, moving such gob from the loading position to a pressing position within the blank cavity, applying air pressure in excess of 80 p.s.i.g. to create a fluid pressure on the molten glass gob pressing it into conformity with the mold and extended plunger, retracting the cavity plunger; expanding the plunger cavity; cooling the parison; and separating the parison from the baffle means and the blank mold.

2. A method according to claim 1, wherein the air pressure is a compressed air force on the gob pressing the gob against the plunger and the mold.

3. A method according to claim 1, wherein the step of expanding the plunger cavity comprises applying a counter air pressure to the interior of the parison after the plunger has been retracted and prior to parison separation.

4. The method of forming a glass parison, in a machine having at least one blank mold and baffle means, and a loading cavity, the mold and baffle means defining a cavity and having a cavity plunger whose volume is at least 15% of the volume of the blank mold cavity, which method comprises the steps of: placing the cavity plunger into its position of maximum penetration into the blank mold cavity, introducing a premeasured gob of molten glass into the loading cavity, moving the molten glass from the loading cavity to the blank cavity by use of compressed air, applying compressed air adjacent the top surface of the molten glass to press it uniformly against the surfaces of the blank mold cavity and the cavity plunger, cooling the glass, removing the cavity plunger, applying compressed air through the finish of the parison to expand the parison to its desired shape and further cooling the glass; and separating the parison from the blank mold and the baffle means.

5. Apparatus for forming glass parisons comprising, in combination, a loading cavity member, at least one blank mold defining a mold cavity, said blank mold having an opening at its upper end for receiving a premeasured gob of molten glass from said loading cavity, a plunger mounted adjacent the lower end of said blank mold, said plunger having a volume of at least 15% of the volume of such mold cavity, said plunger being movable between an initial extended position within the mold cavity and retracted positions, means for urging such gob downwardly from said loading cavity to said mold cavity and for applying a fluid force to such gob to press the molten glass against said cavity and against said extended plunger, baffle means for closing such mold opening and means for applying compressed air through the neck of the parison to expand the parison against said baffle means.

6. Apparatus for forming glass parisons according to claim 5, wherein said loading cavity member is positioned above the upper end of said blank mold, said loading cavity member defining a passageway therethrough in communication with such upper opening.

7. Apparatus for forming glass parisons, according to claim 6, wherein said loading cavity member is integrally connected to said blank mold.

8. Apparatus for forming glass parisons, according to claim 6, wherein said baffle means includes an air valve in communication with such blank mold cavity.

9. Apparatus for forming glass parisons according to claim 5, wherein said apparatus includes a plurality of blank molds.

* * * * *